(12) United States Patent
Zenitani et al.

(10) Patent No.: US 8,871,344 B2
(45) Date of Patent: *Oct. 28, 2014

(54) HYDROPHOBIZATION TREATMENT OF SILICA PARTICLES

(75) Inventors: Yuka Zenitani, Kanagawa (JP); Hideaki Yoshikawa, Kanagawa (JP); Hiroyoshi Okuno, Kangawa (JP); Shunsuke Nozaki, Kanagawa (JP); Shinichiro Kawashima, Kanagawa (JP); Sakae Takeuchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 12/912,057

(22) Filed: Oct. 26, 2010

(65) Prior Publication Data

US 2011/0318581 A1 Dec. 29, 2011

(30) Foreign Application Priority Data

Jun. 25, 2010 (JP) ................................. 2010-145221

(51) Int. Cl.
C01B 33/12 (2006.01)
C01B 33/00 (2006.01)
C01B 33/146 (2006.01)
C01B 33/145 (2006.01)

(52) U.S. Cl.
CPC .................................. *C01B 33/145* (2013.01); *C01B 33/146* (2013.01)
USPC .......................................... 428/402; 423/335

(58) Field of Classification Search
None
See application file for complete search history.

(56) References Cited

U.S. PATENT DOCUMENTS

| | | | |
|---|---|---|---|
| 4,775,520 A | 10/1988 | Unger et al. | |
| 4,849,390 A | 7/1989 | Sano et al. | |
| 4,902,598 A | 2/1990 | Winnik et al. | |
| 4,911,903 A | 3/1990 | Unger et al. | |
| 5,221,497 A | 6/1993 | Watanabe et al. | |
| 5,597,512 A | 1/1997 | Watanabe et al. | |
| 5,609,675 A | 3/1997 | Noritake et al. | |
| 5,674,589 A * | 10/1997 | Bennett et al. | 428/149 |
| 5,985,229 A | 11/1999 | Yamada et al. | |
| 5,998,329 A * | 12/1999 | Derolf et al. | 502/407 |
| 6,113,682 A | 9/2000 | Shin et al. | |
| 6,403,271 B1 | 6/2002 | Suzuki et al. | |
| 6,770,130 B2 | 8/2004 | Kato et al. | |
| 6,811,944 B2 | 11/2004 | Higuchi et al. | |
| 6,875,549 B2 * | 4/2005 | Yamazaki et al. | 430/106.1 |
| 7,846,632 B2 * | 12/2010 | Nakatani | 430/108.7 |
| 2004/0067189 A1 * | 4/2004 | Sugiura et al. | 423/335 |
| 2004/0137353 A1 | 7/2004 | Iida et al. | |
| 2004/0222618 A1 * | 11/2004 | Azechi et al. | 280/728.1 |
| 2004/0229040 A1 | 11/2004 | Kudo et al. | |
| 2005/0260515 A1 | 11/2005 | Kato et al. | |
| 2007/0020543 A1 | 1/2007 | Nakatani | |
| 2007/0218387 A1 * | 9/2007 | Ishii et al. | 430/108.7 |
| 2008/0086951 A1 | 4/2008 | Wakamiya et al. | |
| 2008/0268362 A1 | 10/2008 | Kudo | |
| 2010/0203443 A1 | 8/2010 | Okita et al. | |
| 2010/0330488 A1 | 12/2010 | Ieda | |
| 2011/0209413 A1 | 9/2011 | Nishida et al. | |
| 2011/0318584 A1 | 12/2011 | Yoshikawa et al. | |
| 2011/0319647 A1 | 12/2011 | Yoshikawa et al. | |

FOREIGN PATENT DOCUMENTS

| | | |
|---|---|---|
| CN | 86106689 A | 5/1987 |
| CN | 1380585 A | 11/2002 |
| CN | 101271287 A | 9/2008 |
| EP | 0 574 642 A1 | 12/1993 |
| JP | A-62-52119 | 3/1987 |
| JP | A-63-310714 | 12/1988 |
| JP | A-1-317115 | 12/1989 |
| JP | A 1-317115 | 12/1989 |
| JP | A 4-187512 | 7/1992 |
| JP | A-4-238807 | 8/1992 |
| JP | A-04-255755 | 9/1992 |
| JP | A-5-4812 | 1/1993 |
| JP | A-06-041419 | 2/1994 |
| JP | A-6-254383 | 9/1994 |
| JP | A-7-118008 | 5/1995 |
| JP | A 7-118008 | 5/1995 |
| JP | A-7-277725 | 10/1995 |
| JP | A-8-12305 | 1/1996 |
| JP | A-08-283617 | 10/1996 |
| JP | A-09-143401 | 6/1997 |
| JP | A-9-202612 | 8/1997 |
| JP | A-11-60232 | 3/1999 |
| JP | A 11-060232 | 3/1999 |
| JP | A-11-286611 | 10/1999 |
| JP | 2000344512 A * | 12/2000 |

(Continued)

OTHER PUBLICATIONS

Machine translation of JP 2001-189009 (2001).*
Machine translation of JP 2000-344512 (2000).*
Apr. 12, 2012 Extended European Search Report issued in European Patent Application No. 11185668.8.
Sep. 10, 2012 Australian Office Action issued in Australian Patent Application No. 2011232772.
Sep. 17, 2012 Office Action issued in U.S. Appl. No. 12/917,814.
U.S. Appl. No. 13/214,816 in the name of Yoshikawa et al., filed Aug. 22, 2011.
U.S. Appl. No. 13/214,657 in the name of Zenitani et al., filed Aug. 22, 2011.

(Continued)

*Primary Examiner* — Alicia Chevalier
*Assistant Examiner* — Alexandre Ferre
(74) *Attorney, Agent, or Firm* — Oliff PLC

(57) ABSTRACT

The invention provides silica particles including primary particles, the primary particles having a volume average particle diameter of from about 80 nm to about 300 nm, a particle size distribution index of from about 1.10 to about 1.40, an average circularity of from about 0.70 to about 0.92, and a circularity distribution index of from about 1.05 to about 1.50, the silica particles including primary particles having a circularity of about 0.95 or greater at a proportion of about 10% or less by number of particles.

12 Claims, No Drawings

(56) References Cited

FOREIGN PATENT DOCUMENTS

| | | |
|---|---|---|
| JP | A-2001-150334 | 6/2001 |
| JP | 2001189009 A * | 7/2001 |
| JP | A 2002-038049 | 2/2002 |
| JP | A-2002-38049 | 2/2002 |
| JP | A-2002-146233 | 5/2002 |
| JP | A-2003-133267 | 5/2003 |
| JP | A 2003-133267 | 5/2003 |
| JP | A-2003-165718 | 6/2003 |
| JP | A-2003-171117 | 6/2003 |
| JP | A 2004-035293 | 2/2004 |
| JP | A-2004-35293 | 2/2004 |
| JP | A-2004-102236 | 4/2004 |
| JP | A-2004-203638 | 7/2004 |
| JP | A 2004-203638 | 7/2004 |
| JP | A-2004-338969 | 12/2004 |
| JP | A-2005-84295 | 3/2005 |
| JP | A-2006-028319 | 2/2006 |
| JP | A-2006-251220 | 9/2006 |
| JP | A-2007-22827 | 2/2007 |
| JP | A-2008-169102 | 7/2008 |
| JP | A 2008-169102 | 7/2008 |
| JP | A-2008-174430 | 7/2008 |
| JP | A-2008-285406 | 11/2008 |
| JP | A 2009-078935 | 4/2009 |
| JP | A-2009-78935 | 4/2009 |
| JP | A-2009-137791 | 6/2009 |
| JP | A 2009-137791 | 6/2009 |
| JP | A 2009-149493 | 7/2009 |
| JP | A-2009-149493 | 7/2009 |
| JP | A 2009-161371 | 7/2009 |
| JP | A-2009-161371 | 7/2009 |
| JP | A-2011-185998 | 9/2011 |
| JP | A-2012-6781 | 1/2012 |
| JP | A-2012-6789 | 1/2012 |
| WO | WO 2008/018966 A2 | 2/2008 |
| WO | WO 2010/052945 A1 | 5/2010 |

OTHER PUBLICATIONS

U.S. Appl. No. 12/917,814 in the name of Yoshikawa et al., filed Nov. 2, 2010.
Japanese Patent Office, Notice of Reasons for Rejection mailed Oct. 29, 2013 in Japanese Patent Application No. 2010-145221 w/English-language Translation.
Jan. 30, 2014 Office Action issued in U.S. Appl. No. 13/214,816.
Jan. 30, 2014 Office Action issued in U.S. Appl. No. 13/214,657.
Dec. 19, 2013 Office Action issued in Chinese Application No. 201010546805.8 (with English Translation).
Jul. 19, 2013 Office Action issued in U.S. Appl. No. 13/214,657.
Aug. 16, 2013 Office Action issued in U.S. Appl. No. 13/214,816.
Oct. 15, 2013 Office Action issued in Japanese Application No. 2010-143828 (with English Translation).
Kim et al., "Influence of reaction conditions on sol-precipitation process producing silicon oxide particles," Ceramics International, vol. 28 (2002), pp. 187-194.
Wang et al., "Preparation of spherical silica particles by Stober process with high concentration of tetra-ethyl-orthosilicate," Journal of Colloid and Interface Science, vol. 341, pp. 23-29, available online Sep. 18, 2009.
Nagao et al., "Particle formation in the hydrolysis of tetraethyl orthosilicate in pH buffer solution," Journal of Colloid and Interface Science, vol. 279 (2004), pp. 143-149.
Mar. 20, 2013 Office Action issued in U.S. Appl. No. 12/917,814.
Jul. 22, 2013 Office Action issued in Australian Patent Application No. 2012258292.
U.S. Appl. No. 13/934,928 in the name of Iwanaga et al., filed Jul. 3, 2013.
U.S. Appl. No. 13/670,040 in the name of Iwanaga et al., filed Nov. 6, 2012.
May 7, 2014 Office Action issued in U.S. Appl. No. 12/917,814.
Mar. 21, 2014 Office Action issued in U.S. Appl. No. 13/670,040.
Aug. 20, 2014 Office Action issued in Chinese Application No. 201010546805.8 (with English Translation).
Aug. 28, 2014 Office Action issued in U.S. Appl. No. 13/670,040.
Other Document 1: Table to confirm that the oxide particles described in [Table 1] of [0265] of Publication 1 satisfy the formula (1) of Chaim 1 of the present application (with English Translation).
Jul. 7, 2014 Information Offer Form issued in Japanese Application No. 2011-008842 (with English Translation).

* cited by examiner

HYDROPHOBIZATION TREATMENT OF SILICA PARTICLES

CROSS-REFERENCE TO RELATED APPLICATION

This application is based on and claims priority under 35 USC 119 from Japanese Patent Application No. 2010-145221 filed Jun. 25, 2010.

BACKGROUND

1. Technical Field

The present invention relates to silica particles and a method of producing the same.

2. Related Art

Silica particles are used as additives or main ingredients of toners, cosmetics, rubbers, abrasives and the like, and have a role of, for example, improving the strength of resin, improving the fluidity of powder, or suppressing packing. Since it is considered that the properties of the silica particles are likely to depend on the shape of the silica particles, silica particles having various shapes have been proposed.

SUMMARY

According to an aspect of the invention, there is provided silica particles including primary particles, the primary particles having a volume average particle diameter of from about 80 nm to about 300 nm, a particle size distribution index of from about 1.10 to about 1.40, an average circularity of from about 0.70 to about 0.92, and a circularity distribution index of from about 1.05 to about 1.50, the silica particles including primary particles having a circularity of about 0.95 or greater at a proportion of about 10% or less by number of particles.

DETAILED DESCRIPTION

<Silica Particles>

The silica particles according to this exemplary embodiment include silica particles including primary particles, the primary particles having a volume average particle diameter of from about 80 nm to about 300 nm, a particle size distribution index of from about 1.10 to about 1.40, an average circularity of from about 0.70 to about 0.92, and a circularity distribution index of from about 1.05 to about 1.50, the silica particles including primary particles having a circularity of about 0.95 or greater at a proportion of about 10% or less by number of particles.

Hereinafter, when the primary particles are simply referred to as "primary particles", these primary particles are silica primary particles.

Due to the aforementioned characteristics, the silica particles according to this exemplary embodiment exhibit favorable fluidity, favorable attachment properties and dispersibility with respect to other particles. The reasons why the silica particles according to this exemplary embodiment exhibit these effects are not clear, but are presumed to be as follows.

Since the particle size distribution is relatively uniform in a specific particle diameter range, the degree of attachment of the particles with each other is relatively low and thus relatively less likely to cause friction among the particles, as compared with particles having a broader particle size distribution. As a result, it is considered that the particles exhibit favorable fluidity. Furthermore, since the silica particles according to this exemplary embodiment have a nonspherical shape with a low circularity, a relatively narrow circularity dispersion, and a proportion of primary particles having a circularity of 0.95 or greater of about 10% less by number of particles, the degree of attachment of particles to each other is considered to be even lower as compared with particles having a spherical shape. In addition, since occurrence of rolling or uneven distribution of the silica particles on other particles, to which the silica particles according to this exemplary embodiment are added, is suppressed, it is presumed that the silica particles according to this exemplary embodiment exhibit favorable attachment properties and dispersibility.

In view of the above, it is considered that the silica particles according to this exemplary embodiment exhibit favorable fluidity, favorable attachment properties and favorable dispersibility with respect to other particles.

Hereinafter, the silica particles according to this exemplary embodiment will be described in detail.

Physical Properties

—Volume Average Particle Diameter—

The volume average particle diameter of the primary particles of the silica particles according to this exemplary embodiment is from 80 nm or about 80 nm to 300 nm or about 300 nm.

When the volume average particle diameter of the primary particles is lower than 80 nm or about 80 nm, the particle shape tends to be spherical and it may be difficult to have a shape having a circularity of from 0.70 or about 0.70 to 0.92 or about 0.92. When the volume average particle diameter of the primary particles exceeds 300 nm or about 300 nm, it may be difficult to improve the strength of resin particles when the silica particles are attached to a target such as resin particles or iron powder, whereby it may be difficult to improve the fluidity of the target.

The volume average particle diameter of the primary particles is preferably from 90 nm to 250 nm, and more preferably from 100 nm to 200 nm.

The volume average particle diameter of the primary particles is measured using an LS coulter (particle size analyzer manufactured by Beckman Coulter). The measured particle size distribution is divided into plural particle size ranges (channels), a cumulative distribution is drawn from the side of smaller size based on each particle volume, and the particle diameter at an accumulation of 50% is defined as a volume average particle diameter (D50v).

—Particle Size Distribution Index—

The particle size distribution index of the primary particles of the silica particles of this exemplary embodiment is from 1.10 or about 1.10 to 1.40 or about 1.40.

Silica particles in which the particle size distribution index of the primary particles is lower than 1.10 or about 1.10 are difficult to produce. The particle size distribution index of the primary particles exceeding 1.40 or about 1.40 is not preferred because coarse particles may be formed or dispersibility on the target may deteriorate due to variation in particle diameters.

The particle size distribution index of the primary particles is preferably from 1.10 to 1.25.

The particle size distribution index of the primary particles is measured using an LS coulter (particle size analyzer manufactured by Beckman Coulter). The measured particle size distribution is divided into plural particle size ranges (channels), a cumulative distribution is drawn from the side of smaller size based on each particle volume, and the square root of the value obtained by dividing the particle diameter D84v at an accumulation of 84% by the particle diameter D16v at an accumulation of 16% is defined as a particle size distribution index (GSDv).

Accordingly, the particle size distribution index (GSDv) is expressed by $(D84v/D16v)^{0.5}$.

—Average Circularity—

The average circularity of the primary particles of the silica particles according to this exemplary embodiment is from 0.70 or about 0.70 to 0.92 or about 0.92.

When the average circularity of the primary particles exceeds 0.92 or about 0.92, the primary particles may have a spherical shape and the same characteristics as that of spherical silica particles. Thus, when the silica particles are added to a target, for example, other particles such as resin particles or a powder, mixing suitability and attachment properties with respect to the target may be poor, resistance to mechanical load may be low, and fluidity may easily deteriorate. Therefore, for example, when the silica particles and resin particles are mixed and stirred, or after being stored for a long time, the silica particles may be unevenly attached to the resin particles or, conversely, may be detached from the resin particles. When the average circularity of the primary particles is lower than 0.70 or about 0.70, the particles may have a shape with a large vertical/horizontal ratio. As a result, the silica particles tend to crack due to concentrated stress upon application of mechanical load. Further, it may be difficult to produce primary particles having an average circularity of lower than 0.70 by a sol-gel method.

The average circularity of the primary particles is preferably from 0.72 to 0.85.

The circularity of the primary particles is obtained as "100/SF2" calculated by the following Equation (1) from an image analysis of the primary particles obtained by observing, with an SEM, the primary particles after being dispersed on resin particles having a particle diameter of 100 μm (polyester, weight average molecular weight Mw=50,000).

$$\text{Circularity}(100/SF2)=4\pi\times(A/I^2) \quad \text{Equation (1)}$$

In Equation (1), I represents a peripheral length of the primary particles shown in the image, and A represents a projected area of the primary particles.

The average circularity of the primary particles is obtained as the 50% circularity in terms of cumulative frequency based on the circularity of 100 primary particles obtained by the image analysis as described above. The circularity distribution index as described later is obtained as a square root of the value obtained by dividing the 84% circularity by the 16% circularity in terms of cumulative frequency.

—Circularity Distribution Index—

The circularity distribution index of the primary particles of the silica particles of this exemplary embodiment is from 1.05 or about 1.05 to 1.50 or about 1.50.

Particles having a circularity distribution index of less than 1.05 or about 1.05 are difficult to produce. When the circularity distribution index exceeds 1.50 or about 1.50, there are primary particles having a narrow shape with a large axis/major axis ratio, and the intended use needs to be selected accordingly. For example, these particles may be effectively used as abrasives, whereas due to poor dispersibility on a target, such as resin particles or powder, these particles may not be suitable for use in toners or developers since sufficient strength or fluidity may not be achieved.

The circularity distribution index of the primary particles is preferably from 1.10 to 1.45.

—Proportion of Primary Particles Having Circularity of 0.95 or More—

In the silica particles of this exemplary embodiment, the proportion of primary particles having a circularity of 0.95 or more with respect to the total primary particles is 10% or less by number or particles, or about 10% or less by number or particles.

Spherical particles having a circularity of 0.95 or more are less likely to be attached to a target, such as resin particles or iron powder, as compared with nonspherical particles. Accordingly, when the proportion of spherical particles having a circularity of 0.95 or more exceeds 10% by number of particles, the proportion of primary particles that are less likely to be attached to an adhesion target is increased. As a result, for example, attachment properties of the silica particles to the target may deteriorate.

Further, when the proportion of the silica particles having a circularity of 0.95 or more is greater than 10% by number of particles, problems may occur in that when the silica particles and the target are mixed and stirred, the silica particles may be detached from the target due to load applied while stirring, or the silica particles may be unevenly attached to the adhesion target when a mixture of the silica particles and the target is stored over a long time.

The proportion of the primary particles having a circularity of 0.95 or more is preferably smaller. Specifically, the proportion of the primary particles having a circularity of 0.95 or more is preferably 8% or less by number of particles, and more preferably 5% or less by number of particles.

Components and Surface Treatment

The silica particles according to this exemplary embodiment are not particularly limited as long as silica ($SiO_2$) is contained as a main component, and may be either crystalline or amorphous. Further, the silica particles may be particles produced by using water glass or a silicon compound such as alkoxy silane as a raw material, or may be particles obtained by grinding quartz.

From the viewpoint of dispersibility of the silica particles, the surface of the silica particles is preferably hydrophobized. For example, the surface of the silica particles may be hydrophobized by covering with alkyl groups. For example, the surface of the silica particles can be hydrophobized by reacting the surface with a known organosilicon compound having an alkyl group. Details of the method of hydrophobization will be described later.

As is previously described, the silica particles according to this exemplary embodiment are nonspherical silica particles that exhibit favorable fluidity, as well as excellent attachment properties and dispersibility with respect to other particles. Since the spherical shape of the silica particles is easy to maintain even when the particles are mixed with resin particles or iron powder, and stirred or the like, the particles may exhibit favorable fluidity. Accordingly, the silica particles according to this exemplary embodiment are applicable to various kinds of products, such as toners, cosmetics and abrasives.

<Method of Producing Silica Particles>

The method of producing the silica particles according to this exemplary embodiment is not particularly limited insofar as the silica particles obtained by this method include primary particles having a volume average particle diameter of from 80 nm or about 80 nm to 300 nm or about 300 nm, a particle size distribution index of from 1.10 or about 1.10 to 1.40 or about 1.40, an average circularity of from 0.70 or about 0.70 to 0.92 or about 0.92, and a circularity distribution index of from 1.05 or about 1.05 to 1.50 or about 1.50; and the proportion of primary particles having a circularity of 0.95 or more with respect to the silica particles is 10% or less by number of particles, or about 10% or less by number of particles.

For example, the silica particles according to this exemplary embodiment may be produced by a dry method in which silica particles having a particle diameter that exceeds 300 nm are ground and classified, or by a so-called wet method in which particles are produced by a sol-gel method from a silicon compound such as alkoxysilane as a raw material. Examples of the wet method include, in addition to a sol-gel method, a method of obtaining a silica sol using water glass as a raw material.

The silica particles according to this exemplary embodiment are silica particles containing primary particles having a volume average particle diameter of from 80 nm or about 80 nm to 300 nm or about 300 nm, a particle size distribution index of from 1.10 or about 1.10 to 1.40 or about 1.40, an average circularity of from 0.70 or about 0.70 to 0.92 or about 0.92, and a circularity distribution index of from 1.05 or about 1.05 to 1.50 or about 1.50. Silica particles having these physical properties are preferably produced by a method of producing silica particles according to this exemplary embodiment including the following processes.

The method of producing silica particles according to this exemplary embodiment includes:

providing an alkali catalyst solution, which includes a first alkali catalyst at a concentration of from 0.6 mol/L to 0.85 mol/L, in a solvent comprising alcohol; and supplying tetraalkoxysilane and a second alkali catalyst to the alkali catalyst solution, the tetraalkoxysilane being supplied at a supply rate of from about 0.002 mol/(mol·min) to less than about 0.006 mol/(mol·min) with respect to the alcohol, the supply rate corresponding to an amount per minute of from about 0.002 mot to less than about 0.006 mol with respect to 1 mol of the alcohol in the alkali catalyst solution; and the second alkali catalyst being supplied in an amount of from about 0.1 mol to about 0.4 mol per minute with respect to 1 mol of a total supply amount of the tetraalkoxysilane supplied per minute.

More specifically, the method of producing silica particles according to this exemplary embodiment is a method of producing silica particles by supplying, under the presence of alcohol containing an alkali catalyst at the aforementioned concentration, tetraalkoxysilane as a raw material and an alkali catalyst as a catalyst in amounts that satisfy the above relationship, and allowing the tetraalkoxysilane to react to form silica particles.

According to the method of producing silica particles according to this exemplary embodiment, silica particles having a nonspherical shape can be obtained while suppressing generation of coarse aggregates by employing the technique as mentioned above. The reasons for this are not clear, but are presumed to be as follows.

First, an alkali catalyst solution in which an alkali catalyst is contained in a solvent containing alcohol is provided. When tetraalkoxysilane and an alkali catalyst are supplied to this solution, respectively, the tetraalkoxysilane is allowed to react and nuclear particles are generated. In this process, when the concentration of the alkali catalyst in the alkali catalyst solution is within the range as defined above, it is considered that nuclear particles having a nonspherical shape can be produced while suppressing generation of coarse aggregates such as secondary aggregates. The reason for this is considered to be as follows.

The alkali catalyst forms a coordination on the surface of the nuclear particles and has effects on the shape or the dispersion stability of the nuclear particles, in addition to the functions as a catalyst. When the amount of the alkali catalyst is within the range as mentioned above, the alkali catalyst does not uniformly cover the nuclear particle surface (i.e., the alkali catalyst is unevenly distributed and attached to the nuclear particle surface). As a result, partial deviation is caused in the surface tension and the chemical affinity of the nuclear particles, although dispersion stability of the nuclear particles is maintained, whereby nuclear particles having a nonspherical shape are generated.

As the supply of tetraalkoxysilane and the supply of alkali catalyst are continued, the generated nuclear particles are grown due to the reaction of tetraalkoxysilane, whereby silica particles are obtained. It is considered that, by supplying the alkali catalyst and the tetraalkoxysilane while maintaining the amounts thereof such that the above-mentioned relationship is satisfied, the nuclear particles maintain the nonspherical shape as they are grown, while suppressing generation of coarse aggregates such as secondary aggregates, and as a result, silica particles having a nonspherical shape are generated. This is considered to be caused by the fact that, by controlling the supply rate of tetraalkoxysilane and alkali catalyst so as to satisfy the relationship as described above, partial deviation is maintained in the surface tension and the chemical affinity on the nuclear particle surface while maintaining the dispersibility of the nuclear particles, and thus the nuclear particles are grown while maintaining the nonspherical shape.

Accordingly, primary particles having a circularity of 0.95 or more are hard to generate, and the proportion of primary particles having a circularity of 0.95 or more is easy to be controlled to be 10% or less by number of particles.

It is considered that the supply rate of the tetraalkoxysilane has effects on the particle size distribution or the circularity of the silica particles. It is considered that, by controlling the supply rate of the tetraalkoxysilane to be from 0.002 mol/(mol·min) or about 0.002 mol/(mol·min) to less than 0.006 mol/(mol·min) or about 0.006 mol/(mol·min), the contact probability of the dropped tetraalkoxysilane and the nuclear particles is reduced, and the tetraalkoxysilane is evenly supplied to the nuclear particles before tetraalkoxysilane reacts with each other. Thus, it is considered that the reaction of the tetraalkoxysilane and the nuclear particles can be evenly caused. As a result, it is considered that variation in particle growth can be suppressed and silica particles having a narrow dispersion width can be produced.

Thus, it is considered that, by controlling the supply rate of the tetraalkoxysilane to be within the range as mentioned above, primary particles having a particle size distribution index of from 1.10 to 1.40, an average circularity of from 0.70 to 0.92, and a circularity distribution index of from 1.05 to 1.50 can be easily produced.

The volume average particle diameter of the silica particles is considered to depend on the total supply amount of the tetraalkoxysilane.

In view of the above, it is considered that, according to the method of producing silica particles according to this exemplary embodiment, silica particles can be obtained in which primary particles having a circularity of 0.95 or more is included at a proportion of 10% or less by number of particles, coarse aggregates are hardly generated, the particle size distribution index is from 1.10 to 1.40, the average circularity is from 0.70 to 0.92, and the circularity distribution index is from 1.05 to 1.50.

According to the method of producing silica particles according to this exemplary embodiment, it is considered that silica particles are produced by generating nuclear particles having a nonspherical shape, and then growing these nuclear particles while maintaining their nonspherical shape. Thus, it is considered that nonspherical silica particles having a high degree of shape stability with respect to mechanical load can be obtained.

According to the method of producing silica particles according to this exemplary embodiment, it is considered that since the generated nuclear particles are grown while maintaining their nonspherical shape, and then silica particles are obtained, it is considered that silica particles that are resistant to mechanical load and are hard to be crushed are obtained.

According to the method of producing of silica particles according to this exemplary embodiment, particles are generated by supplying tetraalkoxysilane and an alkali catalyst to an alkali catalyst solution, respectively, and causing reaction of the tetraalkoxysilane. Thus, the total amount of the alkali catalyst may be reduced as compared with the case of forming nonspherical silica particles by a conventional sol-gel process and, as a result, a process for removing the alkali catalyst can be omitted. This is particularly advantageous when the silica particles are applied to products that require high purity.

First, a process of providing an alkali catalyst solution will be described.

The process of preparing an alkali catalyst solution includes providing a solvent containing alcohol, and adding an alkali catalyst to this solvent, thereby preparing an alkali catalyst solution.

The solvent containing alcohol may be formed only of alcohol, or may be a mixed solvent combined with other solvents, such as water, ketones such as acetone, methyl ethyl ketone or methyl isobutyl ketone, cellosolves such as methyl cellosolve, ethyl cellosolve, butyl cellosolve or cellosolve acetate, ethers such as dioxane or tetrahydrofuran, and the like. In that case, the amount of alcohol with respect to the other solvent is preferably 80% by weight or more (preferably 90% by weight or more).

Examples of the alcohol include lower alcohols, such as methanol or ethanol.

The alkali catalyst is a catalyst used for promoting reaction of tetraalkoxysilane (hydrolysis reaction or condensation reaction) and examples thereof include a basic catalyst such as ammonia, urea, monoamine or a quaternary ammonium salt, and ammonia is particularly preferred.

The concentration (content) of the alkali catalyst is from 0.6 mol/L or about 0.6 mol/L to 0.85 mol/L or about 0.85 mol/L, preferably from 0.63 mol/L to 0.78 mol/L, and more preferably from 0.66 mol/L to 0.75 mol/L.

When the concentration of the alkali catalyst is lower than 0.6 mol/L, the dispersibility of nuclear particles during the growth may become unstable. As a result, coarse aggregates such as secondary aggregates may be generated or a gel may be formed, and the particle size distribution may deteriorate in some cases.

In contrast, when the concentration of the alkali catalyst is higher than 0.85 mol/L, stability of the generated nuclear particles may be excessively high. As a result, spherical nuclear particles may be generated and nuclear particles having an average circularity of 0.85 or lower may not be obtained. Accordingly, silica particles having a nonspherical shape may not be obtained.

The concentration of the alkali catalyst is a concentration with respect to the total alcohol catalyst solution (alkali catalyst+solvent containing alcohol).

Next, a process of generating particles will be described.

The process of generating particles is a process for generating silica particles by supplying tetraalkoxysilane and an alkali catalyst to an alkali catalyst solution, respectively, and allowing the tetraalkoxysilane to react in the alkali catalyst solution (hydrolysis reaction or condensation reaction).

In this process of generating particles, silica particles are formed by initially generating nuclear particles by the reaction of tetraalkoxysilane at an early stage of supplying the tetraalkoxysilane (nuclear particles generation stage), and then growing the generated silica particles (nuclear particles growth stage).

Examples of the tetraalkoxysilane to be supplied to the alkali catalyst solution include tetramethoxysilane, tetraethoxysilane, tetrapropoxysilane and tetrabutoxysilane. From the viewpoint of controllability of reaction rate, or the shape, the particle diameter and the particle size distribution of the silica particles to be obtained, tetramethoxysilane and tetraethoxysilane are preferable.

The supply rate of tetraalkoxysilane is from 0.002 mol/(mol·min) or about 0.002 mol/(mol·min) to less than 0.006 mol/(mol·min) or about 0.006 mol/(mol·min) with respect to the alcohol in the alkali catalyst solution.

Specifically, the tetraalkoxysilane is supplied at a supply amount of from 0.002 mol or about 0.002 mol to less than 0.006 mol or about 0.006 mol with respect to 1 mol per minute of the alcohol used in the process for preparing the alkali catalyst solution.

By controlling the supply amount of tetraalkoxysilane in the range as mentioned above, physical properties of the primary particles can be controlled so as to satisfy the particle size distribution index of from 1.10 to 1.40, the average circularity of from 0.70 to 0.92, and the circularity distribution index of from 1.05 to 1.50.

The particle diameter of the silica particles depends on the type of the tetraalkoxysilane and the reaction conditions, but primary particles having a particle diameter of 80 nm or greater can be obtained by controlling the total supply amount of the tetraalkoxysilane to be, for example, 0.855 mol or more with respect to 1 L of silica particle dispersion; and primary particles having a particle diameter of 300 nm or lower can be obtained by controlling the total supply amount of the tetraalkoxysilane to be 3.288 mol or lower with respect to 1 L of silica particle dispersion.

When the supply amount of the tetraalkoxysilane is smaller than 0.002 mol/(mol·min) or about 0.002 mol/(mol·min), the contact probability of the dropped tetraalkoxysilane and the nuclear particles is further reduced. In that case, however, production efficiency is low because it takes a long time to complete the dropping of the total supply amount of tetraalkoxysilane.

It is considered that when the supply amount of the tetraalkoxysilane is 0.006 mol/(mol·min) or more, or about 0.006 mol/(mol·min) or more, reaction of tetraalkoxysilane itself may occur before the dropped tetraalkoxysilane and the nuclear particles start to react with each other. Thus, uneven distribution of tetraalkoxysilane supplied to the nuclear particles may be exaggerated and variation in formation of nuclear particles may be caused. As a result, the width of particle size distribution and the width of shape distribution may be increased, and thus silica particles having a particle size distribution index of from 1.10 to 1.40, an average circularity of from 0.70 to 0.92, and a circularity distribution index of from 1.05 to 1.50 may not be produced.

The supply rate of the tetraalkoxysilane is preferably from 0.002 mol/(mol·min) to 0.0046 mol/(mol·min), and more preferably from 0.002 mol/(mol·min) to 0.0033 mol/(mol·min).

In contrast, examples of the alkali catalyst to be supplied to the alkali catalyst solution include the substances as mentioned above. The alkali catalyst to be supplied may be the same or different from the alkali catalyst that is previously contained in the alkali catalyst solution, but is preferably the same as the alkali catalyst that is previously contained in the alkali catalyst solution.

The supply amount of the alkali catalyst is from 0.1 mol per minute or about 0.1 mol per minute to 0.4 mol per minute or about 0.4 mol per minute, preferably from 0.14 mol per minute to 0.35 mol per minute, and more preferably from 0.18 mol per minute to 0.30 mol per minute, with respect to 1 mol of the total supply amount per minute of the tetraalkoxysilane.

When the supply amount of the alkali catalyst is smaller than 0.1 mol, dispersibility of nuclear particles during the growth process of the generated nuclear particles may become unstable. As a result, coarse aggregates such as secondary aggregates may be generated, or a gel may be formed, whereby the particle size distribution may deteriorate.

In contrast, when the supply amount of the alkali catalyst is larger than 0.4 mol, stability of the generated nuclear particles may be excessively high. As a result, even when nonspherical nuclear particles are generated at a stage of generating nuclear particles, these nuclear particles may grow into spherical particles, and nonspherical silica particles may not be obtained.

In the process of generating particles, tetraalkoxysilane and an alkali catalyst are supplied to an alkali catalyst solution, respectively. The supply may be carried out in a continuous manner or in an intermittent manner.

In the process of generating particles, the temperature (temperature during supply) in the alkali catalyst solution is, for example, preferably from 5° C. to 50° C. and more preferably in the range of from 15° C. to 40° C.

Silica particles are obtained through the processes as described above. At this state, silica particles are obtained in the form of a dispersion, and may be used as a silica particle dispersion as it is, or as a powder of silica particles extracted by removing the solvent.

When the silica particles are used as a silica particle dispersion, as necessary, the solid content concentration of the silica particles may be controlled by diluting or condensing the same with water or alcohol. The silica particle dispersion may be used by substituting the solvent with water-soluble organic solvents, such as other alcohols, esters or ketones.

In contrast, when the silica particles are used as a powder, it is necessary to remove the solvent from the silica particle dispersion. Examples of the method for removing the solvent include known methods such as: 1) a method including removing the solvent by filtration, centrifugal separation, distillation, or the like, and then drying by a vacuum dryer, a tray dryer, or the like; and 2) a method including directly drying a slurry by a fluidized bed dryer, a spray dryer, or the like. The drying temperature is not particularly limited, but is preferably 200° C. or lower. When the drying temperature is higher than 200° C., it is likely to cause bonding among the primary particles or generation of coarse particles due to the condensation of silanol groups remaining on the silica particle surface.

The dried silica particles are preferably pulverized or sieved in order to remove coarse particles or aggregates therefrom, as necessary. The method of pulverization is not particularly limited and may be carried out by a dry pulverizer, such as a jet mill, a vibration mill, a ball mill, or a pin mill. The sieving may be carried out by known devices, such as a vibration sieve or a wind sieve.

The silica particles obtained by the method of producing silica particles according to this exemplary embodiment may be used after hydrophobizing the surface of the silica particles with a hydrophobization agent.

Examples of the hydrophobization agent include known organosilicon compounds having an alkyl group (e.g., a methyl group, an ethyl group, a propyl group or a butyl group). Specific examples include silazane compounds (e.g., silane compounds, such as methyltrimethoxysilane, dimethyldimethoxysilane, trimethylchlorosilane or trimethylmethoxysilane, hexamethyldisilazane and tetramethyldisilazane). The hydrophobization agents may be used singly or in combination of two or more kinds.

Among these hydrophobization agents, organosilicon compounds having a trimethylsilyl group, such as trimethylmethoxysilane or hexamethyldisilazane, are preferable.

The amount of the hydrophobization agent is not particularly limited, but in order to achieve the effect of hydrophobization, for example, the amount of hydrophobization agent is from 1% by weight to 100% by weight, and preferably from 5% by weight to 80% by weight, with respect to the amount of silica particles.

Examples of method for obtaining a dispersion liquid of hydrophobiized silica treated with a hydrophobization agent include a method of obtaining a hydrophobic silica particle dispersion liquid by adding an enough amount of the hydrophobization agent to a silica particle dispersion liquid, and allowing the same to react while stirring at a temperature range of from 30° C. to 80° C. so that the silica particles are hydrophobized. When the reaction temperature is lower than 30° C., the hydrophobization reaction may be difficult to proceed. When the reaction temperature exceeds 80° C., gelling of the dispersion liquid due to self condensation of the hydrophobization agent or self aggregation of the silica particles may be likely to occur.

Examples of the method for obtaining a powder of hydrophobic silica particles include a method including preparing a hydrophobic silica particle dispersion liquid by the method as described above, and then drying the same by the method as described above; a method of obtaining a powder of hydrophobic silica particles by drying a silica particle dispersion liquid to obtain a powder of hydrophilic silica particles, and adding the hydrophobization agent thereto; and a method of obtaining a powder of hydrophobic silica particles by preparing a hydrophobic silica particle dispersion liquid, drying the same to obtain a powder of the hydrophobic silica particles, and adding the hydrophobization agent thereto.

Examples of method for hydrophobizing a powder of silica particles include a method including stirring a powder of hydrophilic silica particles in a treatment bath, such as a Henschel mixer or a fluidized bed, adding the hydrophobization agent thereto, and heating the treatment bath to gasify the hydrophobization agent so as to react with silanol groups on the surface of the powder of silica particles. The treatment temperature is not particularly limited, but is, for example, preferably from 80° C. to 300° C., and more preferably from 120° C. to 200° C.

EXAMPLES

In the following, the present invention will be described in further details with reference to the Examples. However, these Examples are not intended to limit the scope of the invention. Unless otherwise specified, "parts" and "%" are on the weight basis.

Example 1

—Process of Preparing Alkali Catalyst Solution (Alkali Catalyst Solution (1))—

Alkali catalyst solution (1) is obtained by placing 600 g of methanol and 100 g of 10% ammonia water in a 3 L glass reaction container equipped with a metal stirrer, a dropping nozzle (microtube pump made of TEFLON (trade name) and a thermometer, and stirring the mixture. At this time, the ratio of the amount of ammonia catalyst to the amount of $NH_3$ ($NH_3$ (mol)/(ammonia water+methanol) (L)) of alkali catalyst solution (1) is 0.68 mol/L.

—Process of Generating Particles (Silica Particle Suspension (1))—

Subsequently, the temperature of alkali catalyst solution (1) is adjusted to 25° C. and alkali catalyst solution (1) is substituted with nitrogen. Thereafter, while stirring alkali catalyst solution (1), 450 g of tetramethoxysilane (TMOS) and 270 g of ammonia water containing a catalyst ($NH_3$) at a concentration of 4.4% are dropped in the alkali catalyst solution (1) at the same time over 30 minutes. A suspension of silica particles (silica particle suspension (1)) is thus obtained.

At this time, the supply rate of tetramethoxysilane (TMOS) is controlled to be 15 g/min, with respect to the total amount of methanol (mol) in alkali catalyst solution (1), i.e., 0.0053 mol/(mol·min).

The supply rate of 4.4% ammonia water is controlled to be 9 g/min with respect to the total supply amount per minute of tetraalkoxysilane (0.0987 mol/min). This corresponds to 0.24 mol/min with respect to 1 mol of the total supply amount of tetraalkoxysilane to be supplied per minute.

The volume average particle diameter (D50v) and the particle distribution index (GSDv) of the particles in the obtained silica particle suspensions (1) are measured by a previously described particle size analyzer. The results are 170 nm and 1.32, respectively.

—Hydrophopbization Treatment of Silica Particles—

200 g of silica particle suspension (1) (sold content concentration: 13.985%) is subjected to a hydrophobization treatment by adding 5.59 g of trimethylsilane. Thereafter, silica particle suspension (1) is heated using a hot plate at 65° C. and dried. Hydrophobic silica particles (1) having a non-spherical shape are thus obtained.

The obtained hydrophobic silica particles (1) are added to resin particles having a particle diameter of 100 µm, and an SEM photograph of 100 primary particles of hydrophobic silica particles (1) is taken. Then, image analysis of this SEM photograph is conducted. As a result, the primary particles of hydrophobic silica particles (1) have an average circularity of 0.87 and a circularity distribution index of 1.23, and a proportion of primary particles having a circularity of 0.95 or more is 2.9% by number of particles.

The properties of hydrophobic silica particles (1) are evaluated. As a result, hydrophobic silica particles (1) exhibit favorable dispersibility of primary particles, and favorable dispersibility of hydrophobic silica particles (1) when they are dispersed on resin particles. Further, the resin particles coated with hydrophobic silica particles (1) exhibit favorable fluidity and sufficient strength such that the particles are not crushed upon application of mechanical load such as stirring.

The following are details of evaluation of the properties of hydrophobic silica particles (1).

(Dispersibility of Primary Particles)

The dispersibility of primary particles of hydrophobic silica particles (1) is carried out by adding 0.05 g of the silica particles in a mixture of 40 g of pure water and 1 g of methanol, dispersing the same for 10 minutes using an ultrasonic disperser, and then measuring the particle size distribution using an LS coulter (particle size analyzer manufactured by Beckman Coulter). The evaluation is made based on the state of distribution of volume-based particle size distribution, in accordance with the following criteria.

—Evaluation Criteria—

A: The volume-based particle distribution has one peak. Dispersibility is favorable.

B: The volume-based particle distribution has two peaks but the value of main peak is at least 10 times greater than the value of the other peak. Dispersibility is acceptable in practical applications.

C: The volume-based particle distribution has three or more peaks. Dispersibility is not acceptable.

(Dispersibility, Fluidity and Strength when Dispersed on Resin Particles)

The dispersibility, fluidity and strength of hydrophobic silica particles (1) when dispersed on the resin particles are evaluated in accordance with the following criteria.

(Dispersibility when Dispersed on Resin Particles)

The dispersibility of hydrophobic silica particles (1) when dispersed on resin particles is evaluated by adding 0.005 g of hydrophobic silica particles (1) to 5 g of resin particles having a diameter of 100 µm, shaking the same for 10 minutes using a shaking apparatus, and observing the surface of the resin particles using an SEM.

The evaluation is made in accordance with the following criteria.

—Evaluation Criteria (Dispersibility)—

A: Silica particles are uniformly dispersed on the surface of resin particles.

B: A slight degree of aggregation of silica particles is observed, but the coverage with respect to the surface of resin particles is not lowered. The state of dispersion is acceptable for practical applications.

C: A certain degree of aggregation of silica particles is observed, and the coverage with respect to the surface of resin particles is clearly lowered. The state of dispersion is not acceptable for practical applications.

(Fluidity when Dispersed to Resin Particles)

The fluidity of hydrophobic silica particles (1) when dispersed on resin particles is evaluated by adding 0.05 g of hydrophobic silica particles (1) to 2 g of resin particles having a diameter of 10 µm, and mixing the same by shaking for 20 minutes using a shaking apparatus. Thereafter, the resin particles are placed on a 75-µm sieve and shaken at a vibration width of 1 mm for 90 seconds, and the state of the resin particles falling down is observed and evaluated in accordance with the following criteria.

—Evaluation Criteria (Fluidity)—

A: Resin particles do not remain on the sieve.

B: A slight amount of resin particles remains on the sieve.

C: A significant amount of resin particles remain on the sieve.

(Strength when Dispersed in Resin Particles)

The strength of hydrophobic silica particles (1) when dispersed on resin particles is evaluated by adding 0.005 g of hydrophobic silica particles (1) to 5 g of resin particles having a diameter of 100 μm (polyester, weight average molecular weight Mw=50,000). After shaking the same for 10 minutes using a shaking apparatus, sample (1) is obtained therefrom. After further shaking sample (1) for 30 minutes using a shaking apparatus, sample (2) is obtained therefrom. From SEM observation and image analysis of samples (1) and (2), circle equivalent diameters of 100 primary particles of the samples are calculated and compared. The results are evaluated in accordance with the following criteria.

—Evaluation Criteria—

A: There is no difference in circle equivalent diameters of sample (1) and sample (2). Defects are not observed in silica particles.

B: The circle equivalent diameter of sample (2) is slightly lowered, but acceptable for practical applications.

C: The circle equivalent diameter of sample (2) is significantly lowered, and strength is not tolerable.

The production conditions, characteristics, and evaluation results are shown in Tables 1 and 2.

Examples 2 to 10 and Comparative Examples 1 to 9

Alkali catalyst solutions (2) to (10), alkali catalyst solution (101) and alkali catalyst solutions (103) to (109) are prepared in accordance with the method of preparing alkali catalyst solution (1), except that the amount of 10% ammonia water is changed to the amount indicated in the column "added components" "10% ammonia water" "weight (g)" in Table 1.

Alkali catalyst solution (102) is prepared in accordance with the method of preparing alkali catalyst solution (1), except that 100 g of water is further added in combination with 600 g of methanol and 200 g of 10% ammonia water, as indicated in Table 1.

The amount of catalyst ($NH_3$) of alkali catalyst solutions (2) to (10) and alkali catalyst solutions (101) to (109) are shown in the column "added components" "10% ammonia water" "amount of $NH_3$ (mol/L)" in Table 1.

Subsequently, in the preparation of silica particle suspension (1), silica particle suspensions (2) to (10) and silica particle suspensions (101) to (109) are prepared in accordance with the method of preparing silica particle suspension (1), except that alkali catalyst solutions (2) to (10) and alkali catalyst solutions (101) to (109) are used instead of alkali catalyst solution (1); and the amount and the supply rate of tetramethoxysilane, and the catalyst concentration, the amount and the supply rate of ammonia water to be added to the alkali catalyst solution are changed as indicated in Table 1.

Specifically, the amount of the tetramethoxysilane to be added to the alkali catalyst solution is changed from "450 g" described in the column "total amount" "TMOS" "weight (g)", and the supply rate of the tetramethoxysilane is changed from "15 g/min" described in the column "supply rate (g/min)" "TMOS".

The catalyst concentration of ammonia water to be added to the alkali catalyst solution is changed from "4.4%" to that described in the column "total amount" "ammonia water" "$NH_3$ concentration (%)" in Table 1; the amount of ammonia water is changed from "270 g" to that described in the column "total amount" "ammonia water" "weight (g)" in Table 1; and the supply rate of ammonia water is changed from "9 g/min" to that described in the column "supply rate (g/min)" "ammonia water" in Table 1.

The supply rate of ammonia catalyst to alkali catalyst solutions (2) to (10) and alkali catalyst solutions (101) to (109) with respect to 1 mol of the total amount of tetraalkoxysilane supplied per minute is indicated in the column "relative supply rate" "$NH_3$ (mol/min) vs TMOS" in Table 1.

The supply rate of tetraethoxysilane to alkali catalyst solutions (2) to (10) and alkali catalyst solutions (101) to (109) with respect to 1 mol of methanol in alkali catalyst solutions (2) to (10) and alkali catalyst solutions (101) to (109) is indicated in "relative supply rate" "TMOS (mol/(mol·min)) vs methanol" in Table 1.

The volume average particle size (D50v) and the particle size distribution index (GSDv) of the obtained silica particle suspensions (2) to (10), silica particle suspensions (101) to (103) and silica particle suspensions (105) to (109) are measured in accordance with the method of measuring the volume average particle size and the particle size distribution index of silica particle suspension (1). The results are shown in Table 2.

Hydrophilic silica particles are not obtained from silica particle suspension (104) in Comparative Example 4, since a gel is formed during the process of generating particles.

Thereafter, hydrophobic silica particles (2) to (10), hydrophobic silica particles (101), hydrophobic silica particles (102) and hydrophobic silica particles (105) to (109) are obtained by performing hydrophobization treatment to silica particle suspensions (2) to (10), silica particle suspension (101), silica particle suspension (102) and silica particle suspensions (105) to (109), in accordance with the method of hydrophobizing the silica particles in silica particle suspension (1).

The solid content concentration (g) of silica particle suspensions (2) to (10), silica particle suspension (101), silica particle suspension (102) and silica particle suspensions (105) to (109) are shown in Table 1.

The solid content concentration (5) of silica particle suspension (103) in which silica particles are not hydrophobized, and silica particle suspension (104) in which a gel is formed are also shown in Table 1.

The silica particles in silica particle suspension (103), which are not hydrophobized, are heated using a hot plate and dried in the same manner as silica particle suspension (1), thereby obtaining hydrophilic silica particles (103).

SEM photographs of the obtained hydrophobic silica particles (2) to (10), hydrophobic silica particles (101), hydrophobic silica particles (102), hydrophobic silica particles (105) to (109), and hydrophilic silica particles (103) are observed and image analysis is carried out.

The average circularity, the circularity distribution index, and the proportion of primary particles having a circularity of 0.95 or greater are described in the column "primary particle characteristics" in Table 2.

The shape of the obtained silica particles is described in the column "primary particle characteristics" "shape" in Table 2.

The characteristics of hydrophobic silica particles (2) to (10), hydrophobic silica particles (101), hydrophobic silica particles (102), hydrophobic silica particles (105) to (109) and hydrophilic silica particles (103) are evaluated in the same manner as hydrophobic silica particles (1), and the results are shown in Table 2.

TABLE 1

| | Preparation Process | | | | Particle Generation Process | | | | | | | |
|---|---|---|---|---|---|---|---|---|---|---|---|---|
| | Added Components | | | | Total Amount | | | Supply Rate | | Relative Supply Rate | | Hydrophobization |
| | Methanol | Water | 10% Ammonia Water | | TMOS | Water | Ammonia | | (g/min) | | NH₃ | TMOS | Solid |
| | Weight (g) | Weight (g) | Weight (g) | NH₃ (mol/L) | Weight (g) | Weight (g) | NH₃ (%) | TMOS | Ammonia Water | (mol/min) vs TMOS | (mol/(mol·min) vs Methanol | Content in Suspension |
| Example 1 | 600 | 0 | 100 | 0.68 | 450 | 270 | 4.4 | 15 | 9 | 0.24 | 0.0053 | 177.6 |
| Example 2 | 600 | 0 | 90 | 0.62 | 450 | 270 | 4.4 | 15 | 9 | 0.24 | 0.0053 | 177.6 |
| Example 3 | 600 | 0 | 100 | 0.68 | 240 | 120 | 4.4 | 8 | 4 | 0.20 | 0.0028 | 94.70 |
| Example 4 | 600 | 0 | 128 | 0.85 | 450 | 360 | 4.4 | 15 | 12 | 0.32 | 0.0053 | 177.6 |
| Example 5 | 650 | 0 | 100 | 0.64 | 400 | 105 | 4.4 | 15 | 3.9 | 0.1 | 0.0049 | 157.9 |
| Example 6 | 400 | 0 | 80 | 0.8 | 200 | 200 | 4.4 | 4 | 4 | 0.4 | 0.0021 | 78.9 |
| Example 7 | 600 | 0 | 100 | 0.68 | 150 | 100 | 4.0 | 6 | 4 | 0.24 | 0.0021 | 59.2 |
| Example 8 | 600 | 0 | 100 | 0.68 | 560 | 160 | 4.4 | 7 | 2 | 0.11 | 0.0025 | 221 |
| Example 9 | 600 | 0 | 87 | 0.6 | 540 | 144 | 4.4 | 15 | 4 | 0.11 | 0.0053 | 213.1 |
| Example 10 | 200 | 0 | 30 | 0.62 | 180 | 90 | 4.0 | 2 | 1 | 0.18 | 0.0021 | 71 |
| Comp. Ex. 1 | 600 | 0 | 100 | 0.68 | 600 | 60 | 4.0 | 20 | 2 | 0.04 | 0.007 | 236.8 |
| Comp. Ex. 2 | 600 | 100 | 200 | 1.11 | 450 | 270 | 4.4 | 15 | 9 | 0.24 | 0.0053 | 177.6 |
| Comp. Ex. 3 | 600 | 0 | 100 | 0.68 | 600 | 90 | 4.0 | 20 | 3 | 0.05 | 0.007 | 236.8 |
| Comp. Ex. 4 | 600 | 0 | 70 | 0.50 | 450 | 120 | 4.4 | 15 | 4 | 0.11 | 0.0053 | 177.6 |
| Comp. Ex. 5 | 600 | 0 | 120 | 0.80 | 450 | 350 | 7.3 | 15 | 11.7 | 0.51 | 0.0053 | 177.6 |
| Comp. Ex. 6 | 500 | 0 | 75 | 0.62 | 250 | 200 | 4.4 | 2.5 | 2 | 0.32 | 0.001 | 98.7 |
| Comp. Ex. 7 | 430 | 0 | 80 | 0.75 | 450 | 150 | 4.0 | 15 | 5 | 0.12 | 0.0073 | 177.6 |
| Comp. Ex. 8 | 200 | 0 | 30 | 0.62 | 180 | 90 | 4.0 | 2 | 1 | 0.18 | 0.0021 | 71 |
| Comp. Ex. 9 | 200 | 0 | 30 | 0.62 | 290 | 100 | 4.0 | 5.8 | 2 | 0.12 | 0.0061 | 114.5 |

TABLE 2

| | Characteristics of Primary Particles | | | | | | Characteristics of Generated Particles | | | |
|---|---|---|---|---|---|---|---|---|---|---|
| | D50v | Particle Size | Average Circularity | Circularity | Proportion of Primary Particles with Circularity of | Shape | Primary Particle | Characteristics of Resin Particle Coating | | |
| | (nm) | Distribution | (100/SF2) | Distribution | 0.95 or greater | | Dispersibility | Dispersibility | Fluidity | Strength |
| Example 1 | 170 | 1.32 | 0.87 | 1.23 | 2.9 | Nonspherical | A | A | A | A |
| Example 2 | 191 | 1.40 | 0.80 | 1.45 | 1.2 | Nonspherical | A | A | A | A |
| Example 3 | 140 | 1.17 | 0.87 | 1.41 | 8.1 | Nonspherical | A | A | A | A |
| Example 4 | 165 | 1.38 | 0.92 | 1.25 | 8.3 | Nonspherical | A | A | A | A |
| Example 5 | 260 | 1.40 | 0.78 | 1.5 | 2.4 | Nonspherical | B | B | B | B |
| Example 6 | 150 | 1.20 | 0.90 | 1.2 | 8.9 | Nonspherical | A | A | A | A |
| Example 7 | 80 | 1.30 | 0.87 | 1.3 | 7.0 | Nonspherical | A | A | A | A |
| Example 8 | 300 | 1.38 | 0.79 | 1.4 | 2.0 | Nonspherical | A | A | B | B |
| Example 9 | 250 | 1.35 | 0.70 | 1.4 | 1.5 | Nonspherical | A | A | B | B |
| Example 10 | 130 | 1.12 | 0.85 | 1.05 | 6.0 | Nonspherical | A | A | A | A |
| Comp. Ex. 1 | 600 | 1.91 | 0.80 | 1.95 | 2.0 | Nonspherical | C | C | C | C |
| Comp. Ex. 2 | 219 | 1.18 | 0.94 | 1.11 | 25.0 | Spherical | A | A | C | C |
| Comp. Ex. 3 | 163 | 1.31 | 0.85 | 1.82 | 2.2 | Nonspherical | A | C | A | A |
| Comp. Ex. 4 | Gelled | — | — | — | — | — | — | — | — | — |
| Comp. Ex. 5 | 150 | 1.12 | 0.97 | 1.03 | 85.0 | Spherical | A | A | A | C |
| Comp. Ex. 6 | 140 | 1.12 | 0.97 | 1.2 | 80.0 | Spherical | A | A | A | C |
| Comp. Ex. 7 | 320 | 1.48 | 0.92 | 1.4 | 75.0 | Spherical | C | C | C | C |
| Comp. Ex. 8 | 70 | 1.23 | 0.88 | 1.3 | 25.0 | Nonspherical | A | A | C | C |
| Comp. Ex. 9 | 130 | 1.50 | 0.80 | 1.6 | 5.0 | Nonspherical | A | C | C | C |

As shown in Table 2, hydrophobic silica particles (2) to (10) prepared in the Examples have a nonspherical shape as with hydrophobic silica particles (1). Hydrophobic silica particles (2) to (10) also exhibit favorable dispersibility of primary particles, favorable dispersibility when hydrophobic silica particles (2) to (10) are dispersed on resin particles, strength, and fluidity of resin particles.

On the other hand, hydrophobic silica particles (101), (102), (105) to (109) and hydrophilic silica particles (103) prepared in the Comparative Examples do not exhibit favorable results in at least part of dispersibility of primary particles, dispersibility when dispersed on resin particles, strength and fluidity of resin particles.

For example, hydrophobic silica particles (102) have a spherical shape with an average circularity of 0.94 and similar characteristics to that of spherical silica particles, and exhibit inferior results in dispersibility when dispersed on resin particles and fluidity of resin particles, as compared with the hydrophobic silica particles prepared in the Examples, although a favorable result is shown in dispersibility of primary particles.

All publications, patent applications, and technical standards mentioned in this specification are herein incorporated by reference to the same extent as if each individual publication, patent application, or technical standard was specifically and individually indicated to be incorporated by reference.

What is claimed is:

1. Silica particles comprising primary particles, the primary particles having a volume average particle diameter of from about 80 nm to about 300 nm, a particle size distribution index (GSDv) of from about 1.10 to about 1.40, an average circularity of from about 0.70 to about 0.92, and a circularity distribution index (CDI) of from about 1.05 to about 1.50, the silica particles comprising primary particles having a circularity of about 0.95 or greater at a proportion of about 10% or less by number of particles,
wherein the particle size distribution index GSDv and the circularity distribution index CDI are defined as $GSDv=(D84v/D16v)^{0.5}$ $CDI=(C84/C16)^{0.5}$ where D84v is the particle diameter at an accumulation of 84%, D16v is the particle diameter at an accumulation of 16%, C84 is the circularity at an accumulation of 84%, and C16 is the particle diameter at an accumulation of 16%, and
wherein a surface of the silica particles is hydrophobized by using a hydrophobization agent comprising an organosilicon compound having a trimethylsilyl group, and an amount of the hydrophobization agent is from 5% by weight to 80% by weight with respect to the silica particles.

2. The silica particles according to claim 1, wherein the organosilicon compound is at least one selected from the group consisting of a silazane compound and a silane compound.

3. The silica particles according to claim 1, wherein the organosilicon compound including a trimethylsilyl group comprises trimethylmethoxysilane or hexamethyldisilazane.

4. The silica particles according to claim 1, wherein the primary particles have an average circularity of from about 0.80 to about 0.92.

5. The silica particles according to claim 1, wherein the primary particles have an average circularity of from about 0.85 to about 0.92.

6. The silica particles according to claim 1, wherein the primary particles have a volume average particle diameter of from about 150 nm to about 300 nm.

7. The silica particles according to claim 1, wherein the primary particles have a volume average particle diameter of from about 165 nm to about 300 nm.

8. A method of producing silica particles of claim 1, comprising:
providing an alkali catalyst solution, which includes a first alkali catalyst at a concentration of from 0.6 mol/L to 0.85 mol/L, in a solvent comprising alcohol; and
supplying tetraalkoxysilane and a second alkali catalyst to the alkali catalyst solution,
the tetraalkoxysilane being supplied at a supply rate of from about 0.002 mol/(mol·min) to less than about 0.006 mol/(mol·min) with respect to the alcohol, the supply rate corresponding to an amount per minute of from about 0.002 mol to less than about 0.006 mol with respect to 1 mol of the alcohol in the alkali catalyst solution; and
the second alkali catalyst being supplied in an amount of from about 0.1 mol to about 0.4 mol per minute with respect to 1 mol of a total supply amount of the tetraalkoxysilane supplied per minute.

9. The method of producing silica particles according to claim 8, wherein the solvent comprising alcohol is a mixed solvent comprising the alcohol and at least one solvent selected from the group consisting of water, ketone, cellosolve and ether.

10. The method of producing silica particles according to claim 9, wherein an amount of the alcohol with respect to the at least one solvent is about 80% by weight or more.

11. The method of producing silica particles according to claim 8, wherein the first alkali catalyst is at least one selected from the group consisting of ammonia, urea, monoamine and a quaternary ammonium salt.

12. The method of producing silica particles according to claim 8, wherein the tetraalkoxysilane is at least one selected from the group consisting of tetramethoxysilane, tetraethoxysilane, tetrapropoxysilane and tetrabutoxysilane.

* * * * *